(12) United States Patent
Honjo et al.

(10) Patent No.: US 7,960,677 B2
(45) Date of Patent: Jun. 14, 2011

(54) PROJECTION APPARATUS AND DISTANCE MEASUREMENT METHOD WHEREIN THE DISTANCE IS ACQUIRED DURING A PERIOD OF PREDETERMINED COLOR COMPONENTS BEING EMITTED (AS AMENDED)

(75) Inventors: Taichi Honjo, Fussa (JP); Keiichi Kobayashi, Higashiyamato (JP); Hideaki Inoue, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 295 days.

(21) Appl. No.: 12/389,498

(22) Filed: Feb. 20, 2009

(65) Prior Publication Data

US 2009/0207384 A1    Aug. 20, 2009

(30) Foreign Application Priority Data

Feb. 20, 2008    (JP) ................. 2008-038147

(51) Int. Cl.
*H01L 27/00*    (2006.01)
(52) U.S. Cl. ..................... 250/208.1; 250/205
(58) Field of Classification Search ............... 250/208.1, 250/226, 205; 353/69, 70; 345/690–697
See application file for complete search history.

(56) References Cited

U.S. PATENT DOCUMENTS

| 5,552,893 | A | 9/1996 | Akasu |
| 6,670,603 | B2 | 12/2003 | Shimada et al. |
| 7,131,732 | B2 | 11/2006 | Inoue |
| 7,180,510 | B2 | 2/2007 | Inoue et al. |
| 7,766,486 | B2 * | 8/2010 | Sakai ............................. 353/69 |

FOREIGN PATENT DOCUMENTS

| JP | 7-84045 A | 3/1995 |
| JP | 2003-029201 A | 1/2003 |
| JP | 2004-110797 A | 4/2004 |
| JP | 2005-39558 A | 2/2005 |
| JP | 2008-020196 A | 1/2008 |

OTHER PUBLICATIONS

Japanese Office Action dated Feb. 23, 2010 and English translation thereof issued in counterpart Japanese Application No. 2008-038147.

* cited by examiner

*Primary Examiner* — Que T Le
(74) *Attorney, Agent, or Firm* — Holtz, Holtz, Goodman & Chick, PC (57) ABSTRACT

A projection apparatus including a projection drive control unit modulating an emitted light from a light source unit for each of a plurality of color components at predetermined time, and a projection distance acquisition unit irradiating light to the projection screen to acquire a distance to the projection screen, wherein the projection distance acquisition unit carries out laser distance measurement during a period the projection drive control unit modulates a color component of the emitted light to color components except one color component of a plurality of modulated color components.

15 Claims, 8 Drawing Sheets

PROJECTION APPARATUS AND DISTANCE MEASUREMENT METHOD WHEREIN THE DISTANCE IS ACQUIRED DURING A PERIOD OF PREDETERMINED COLOR COMPONENTS BEING EMITTED (AS AMENDED)

CROSS-REFERENCE TO RELATED APPLICATIONS

This application is based upon and claims the benefit of priority from prior Japanese Patent Application No. 2008-038147, filed Feb. 20, 2008, the entire contents of which are incorporated herein by reference.

BACKGROUND OF THE INVENTION

1. Field of the Invention

The present invention relates to a projection apparatus and a distance measurement method.

2. Description of the Related Art

Recently, a data projector has been come into wide use as a projection apparatus. The projection apparatus projects many kinds of images on a screen. The images include an image on a display of a personal computer, a video signal image and an image of an image data stored in a memory card.

In many cases, the projection apparatus uses a small high-luminance light source such as a metal halide lamp and an ultra-high pressure mercury vapor lamp. The projection apparatus irradiates light emitted from the light source to a display device called a liquid crystal device and a digital micro-mirror device (DMD) as three primary lights via color filters using a light source optical system. Further, the projection apparatus projects a transmitted light or reflected light of the display device on a screen via a projection optical system having a zoom function, that is, a lens group.

In such a projection apparatus, a projection screen is obliquely inclined with respect to a plane vertical to an optical axis of the projection light emitted from the projection apparatus. In this case, the following phenomenon occurs; specifically, a projected image is distorted like a trapezoid. In order to solve the foregoing problem, for example, Jpn. Pat. Appln. KOKAI Publication No. 2005-39558 discloses the following technique. According to the technique, distances from several points on the projection screen to the projection apparatus are measured using a phase-difference distance measurement sensor. In this way, the relatively positional relationship of the projection apparatus and the projection screen is determined. Based on the foregoing positional relationship, the foregoing trapezoidal distortion of the projected image is corrected using image processing without physically controlling the relatively positional relationship of the projection apparatus and the projection screen.

Moreover, Jpn. Pat. Appln. KOKAI Publication No. H7-84045 discloses the following technique. According to the technique, distance measurement is made using a laser distance measurement sensor in place of the phase-difference type. The laser distance measurement sensor has the following merits compared with the phase-difference type. Namely, the distance measurement speed is fast, and distance measurement accuracy is high.

However, the following problem arises. Specifically, in the projection apparatus, a distance to the projection screen is measured using laser. In this case, when an image having the same wavelength component as laser beam is projected, distance measurement accuracy is reduced due to an influence of reflected light as the image.

BRIEF SUMMARY OF THE INVENTION

According to one aspect of the invention, there is provided a projection apparatus comprising:
a light source successively emitting each of a plurality of color components of an emitted light at a predetermined time interval;
a display element displaying an image corresponding to the emitted light emitted from the light source on a projection screen; and
a projection distance acquisition unit irradiating light to the projection screen to acquire a distance from the projection apparatus to the projection screen,
wherein the projection distance acquisition unit acquires the distance from the projection apparatus to the projection screen during a period when the light source emits the emitted light having other color components except any one color component of the emitted color components.

BRIEF DESCRIPTION OF THE SEVERAL VIEWS OF THE DRAWING

The objects, features and advantages of the present invention will be obvious from the following detailed description together with the accompanying drawings.

DETAILED DESCRIPTION OF THE INVENTION

The best mode for carrying out the present invention will be hereinafter described with reference to the accompanying drawings. In the following embodiment, technically preferable various limitations are given to carry out the present invention. However, the scope of the invention is not limited to the following embodiment and illustrations.

One embodiment in which a projection apparatus of the present invention is applied to a projector 1 will be described below with reference to the accompanying drawings. According to this embodiment, a projection distance from a projection screen onto which an image is projected by the projector 1 to the projector 1 is acquired. Based on the acquired projection distance, the projected image is focused.

Figure 1:
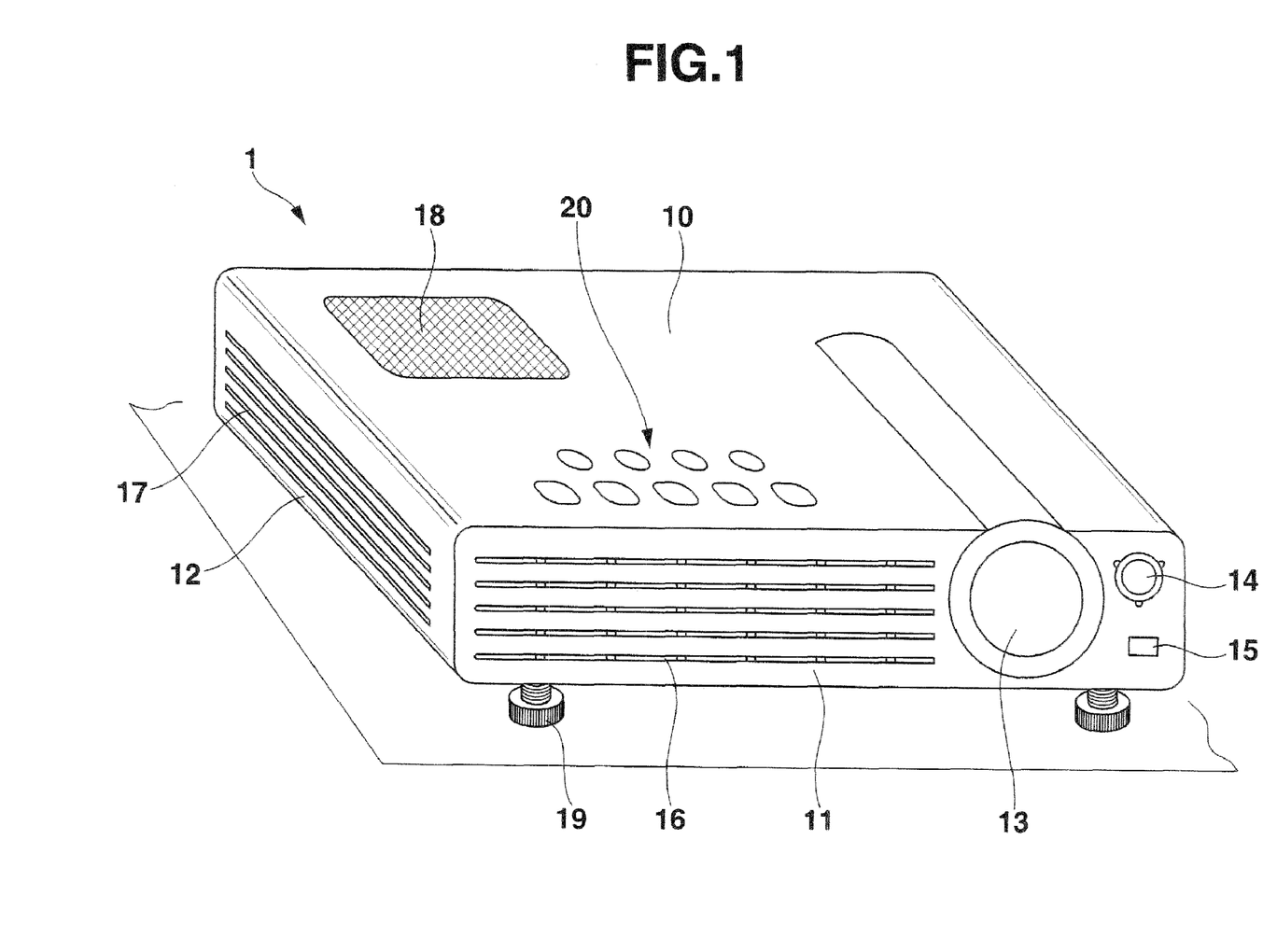
FIG. 1 is a perspective view showing an outer view of a projector according to one embodiment of the present invention.

FIG. 1 is a view showing the outer view of the projector 1. The projector 1 has body cases 10 and 11 as a main housing. The projector 1 includes the following operation blocks, that is, an external operation key input/indicator 20, an audio output unit 18, a projection unit 13, a projection distance acquisition unit 14, and an Ir receiver 15. Specifically, the projection unit 13 projects an image light. The projection distance acquisition unit 14 irradiates a pulse laser toward a projection screen to acquire a projection distance from the unit 14 to the projection screen. The Ir receiver 15 receives a control signal from a remote controller. Further, the side and front portions of the housing case is formed with a plurality of an inlet hole 17 for sucking an external air to cool the inside of the housing case and an air exhaust hole 16. Further, the bottom side of the housing case is provided with a plurality of extendable front legs 19 for manually controlling a projection angle. Further, the backside of the housing case is provided with an input connector 21 (shown in FIG. 2) including a D-SUB terminal for inputting image data externally, an S terminal, and an RCA terminal. Further, an USB terminal, a power supply adapter plug and a memory slot are provided on the backside of the housing case (not shown).

The key input/indicator 20 is composed of a power switch key for turning on/off of the power of the projector 1, a power indicator for indicating power on/off states, a lamp switch key for turning on a halogen lamp described later, a lamp indicator which indicates a turn-on state of the halogen lamp, and an overheat indicator for indicating that the halogen lamp overheats.

Figure 2:
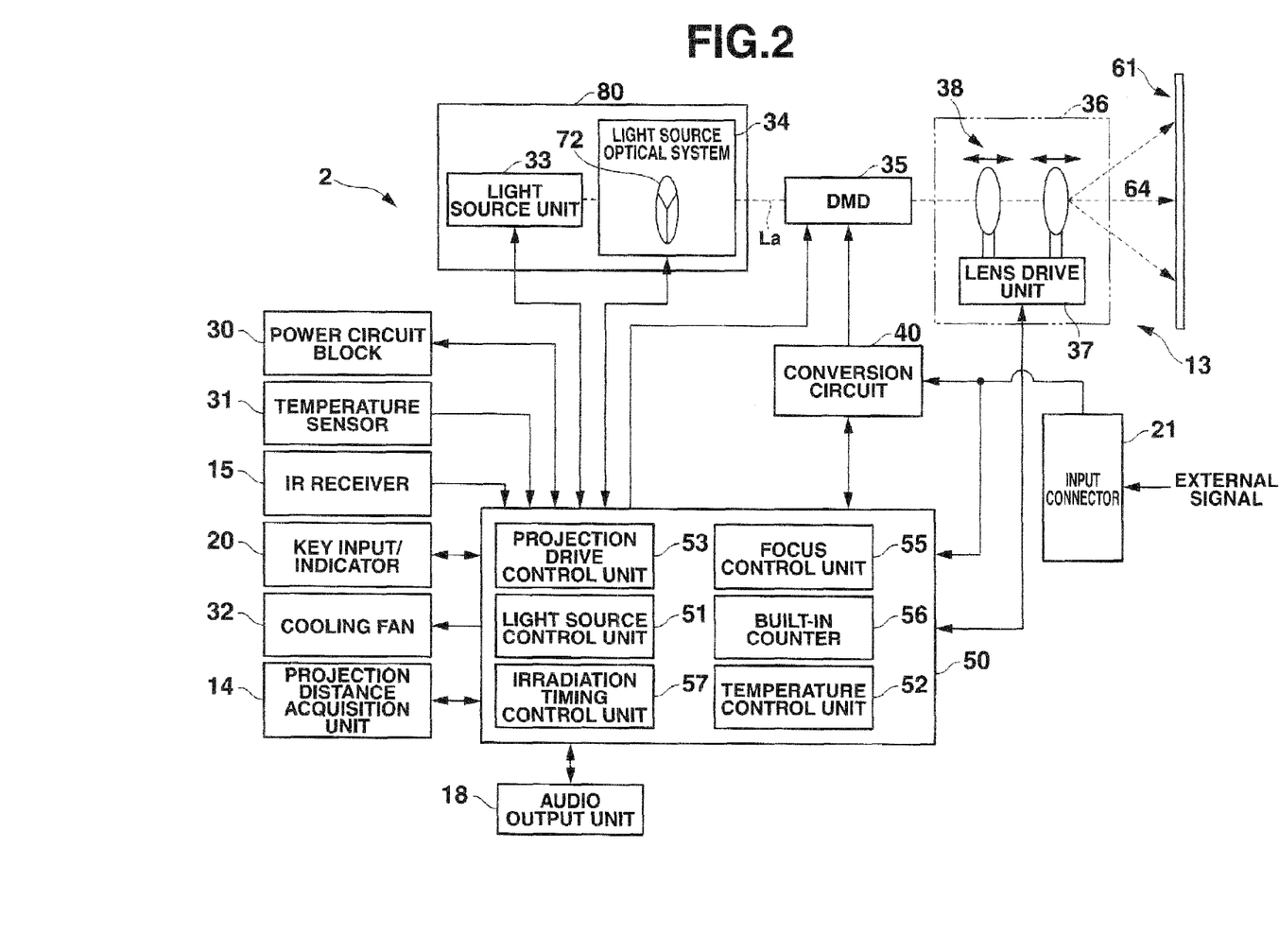
FIG. 2 is a block diagram showing the configuration of the projector according to this embodiment.

FIG. 2 is a block diagram showing the internal configuration (inside of housing case) of the projector 1.

The inside of the housing case of the projector 1 includes the following operation blocks, that is, a power circuit block 30, a temperature sensor 31 for detecting the internal temperature of the projector 1, a cooling fan 32 for cooling the internal temperature of the projector 1 based on the temperature detected by the temperature sensor 31, a light source 80 which emits light (beam) projected onto a projection screen 61, and a conversion circuit 40 which converts an external signal input externally via the input connector 21 to image data corresponding to the display element described later. The projector 1 further includes a digital micro-mirror device (DMD) 35 functioning as a display element which displays an image based on the image data converted by the conversion circuit 40, and a projection optical system 36 which projects light from the halogen lamp reflected to a predetermined direction by the DMD 35 onto the projection screen 61. Further, the projector 1 includes a controller 50 for collectively controlling the foregoing operation blocks.

The light source 80 includes a light source unit 33 including a high-luminance halogen lamp and a light source optical system 34, which collects light emitted from the light source unit 33 to the DMD 35. The light source optical system 34 is interposed between the light source unit 33 and the DMD 35.

The light source optical system 34 is composed of a color wheel 72 and a collective lens, wherein the color wheel 34 is configured to modulate successively the light emitted from the light source unit 33 into different components (e.g., R (red) component, G (green) component, B (blue) component) at predetermined intervals. The collective lens collects the modulated light to the DMD 35 functioning as the display element.

Figure 3:
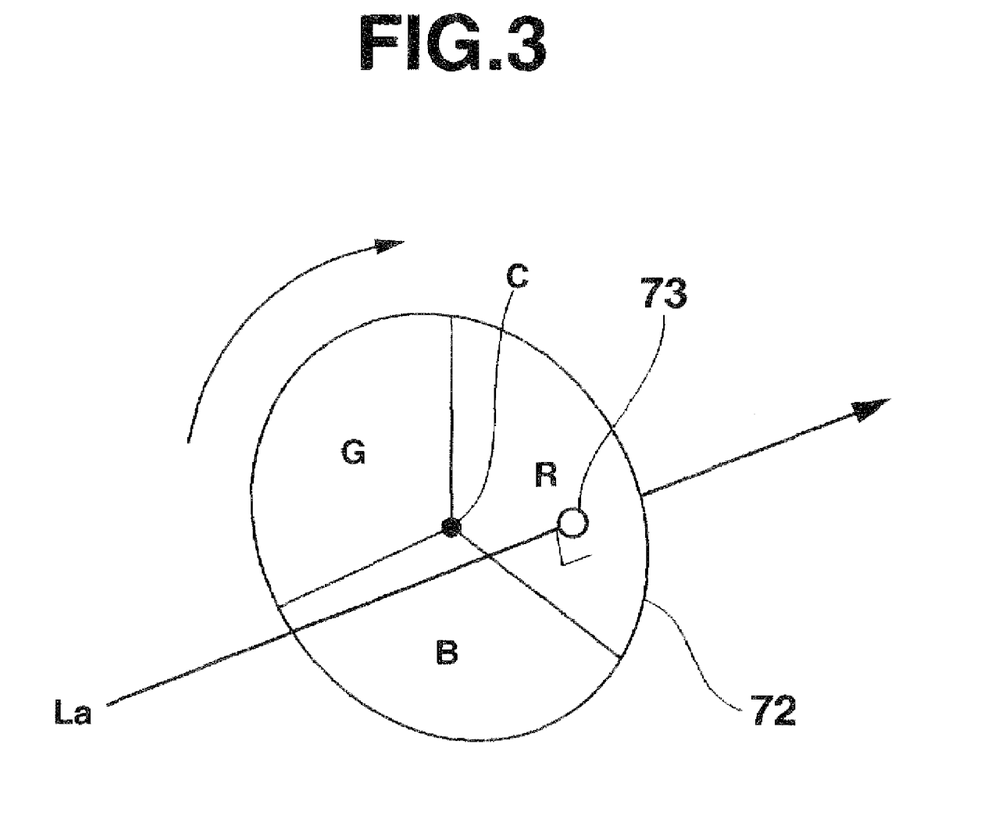
FIG. 3 is a schematic view showing a color wheel.

FIG. 3 schematically shows the color wheel 72.

The color wheel 72 has a disc shape. Sector-like color component filters (e.g., R component, G component, B component) are stuck to a transparent color wheel base disc (not shown) so that they have an equally divided area. Thus, the color wheel 72 modulates the color component of light passing through a filter into the filter color component. The color wheel 72 is interposed between the light source unit 33 and the DMD 35. Further, the color wheel 72 is arranged so that the main optical axis La of light emitted from the light source unit 33 vertically passes through a predetermined one point (color wheel passing point 73) on the surface of the color wheel 72, and not the center of the color wheel 72. When an image is projected, the color wheel 72 is rotated about the rotation center C in the arrow direction, for example, at a fixed speed using the center C of the color wheel 72 as the rotation axis. In this case, color component filters R, G, B pass through the main optical axis La of the emitted light at predetermined intervals, and thereby, the emitted light is successively modulated into each color component. Namely, as seen from FIG. 4, the color wheel 72 is configured in the following manner. Specifically, the color wheel successively modulates the light emitted from the light source unit 33 into R, G and B components during one rotation of the color wheel 72 (one cycle) at predetermined intervals so that the light is emitted to the DMD 35.

Figure 4:
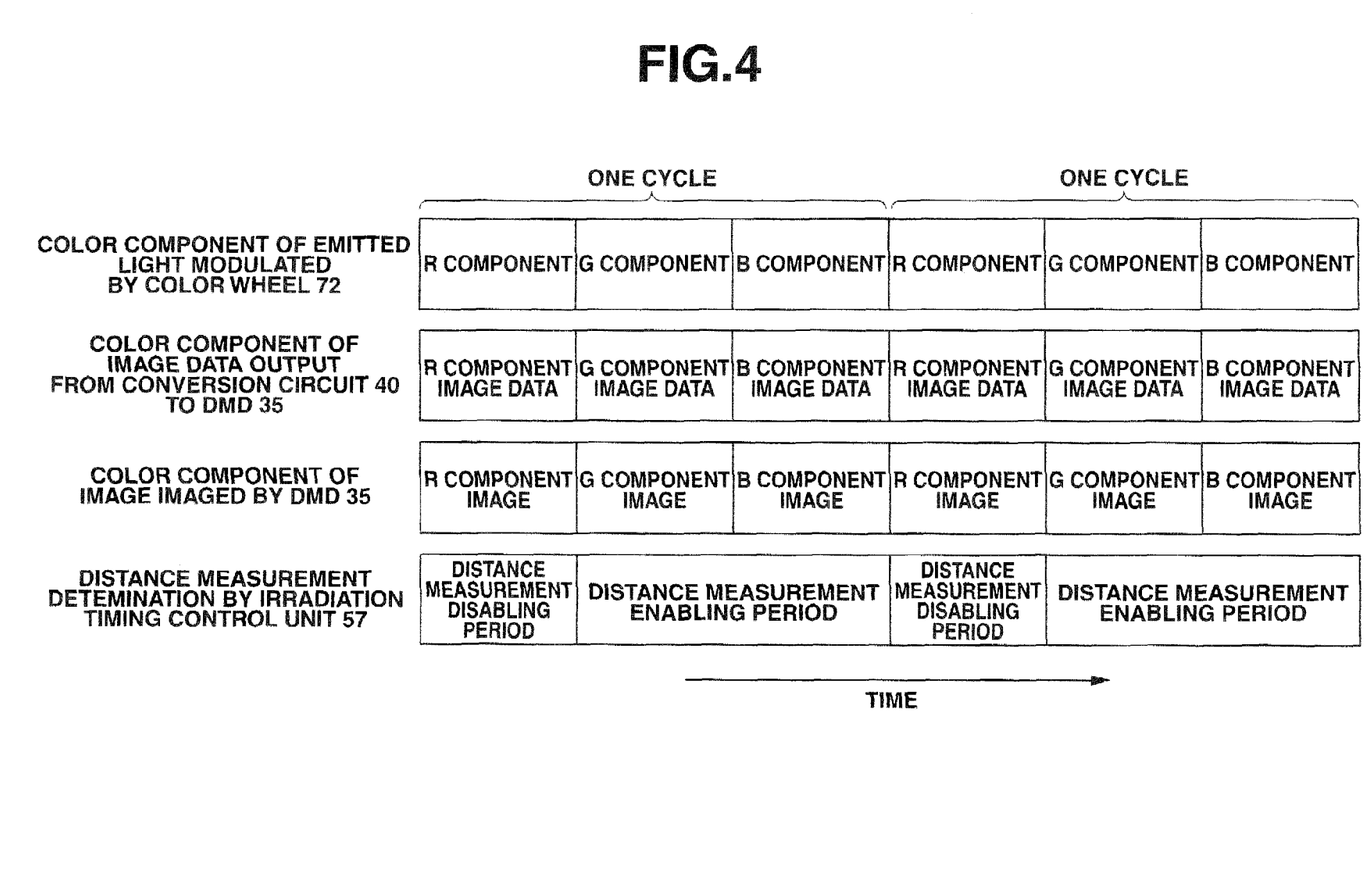
FIG. 4 is a timing chart to explain distance measurement in this embodiment.

The conversion circuit 40 converts video signals input from the input connector 21 to conform to various standards and a previously stored video signal to signals with a predetermined format. These signals are independently developed and processed to color components (e.g., R component, G component, B component), and then, stored in a built-in video RAM provided in the conversion circuit 40. As shown in FIG. 4, the circuit 40 is configured to read out video data corresponding to the color component of the emitted light modulated by the color wheel 72 from the storage content of the video RAM based on instructions from the projection drive control unit 53, and then, outputs the video data to the DMD 35.

The DMD 35 has a structure in which a plurality of micromirrors is arranged like a matrix on a substrate. When light emitted from a halogen lamp is incident to be inclined to one direction with respect to the normal line direction of the substrate, the incident light is reflected in the corresponding direction by the foregoing micro-mirrors.

Specifically, the DMD 35 changes the inclination of each micro-mirror based on image data input from the conversion circuit 40. In this way, each micro-mirror changes light, which is successively incident after modulated to each color component by the light source optical system 34, to the normal line direction on-state beam and oblique direction off-state beam, and thereafter, reflects them in the corresponding directions. Light reflected to the normal line direction as the on-state beam is projected onto the projection screen 61 by a projection optical system 36. Light reflected as the off-state beam is absorbed by an absorption plate (not shown). In other words, a projected image is displayed on the projection screen 61 by bright display by reflection to the normal line direction and by dark display by reflection to the oblique direction. Incidentally, each gradation is expressed by time division drive of each micro-mirror, which controls a ratio of bright and dark display time within a predetermined period.

The projection optical system 36 is used for projecting light, which is reflected to the normal line direction by the DMD 35, onto the projection screen 61. The projection optical system 36 is composed of a focus lens, a lens group 38 and a lens drive unit 37. Specifically, the focus lens focuses a projection image on the projection screen 61. The lens group 38 comprises zoom lenses for optically zooming in and out the projection image. The lens drive unit 37 moves positions of the focus lens and the zoom lenses along the main optical axis La.

Figure 5:
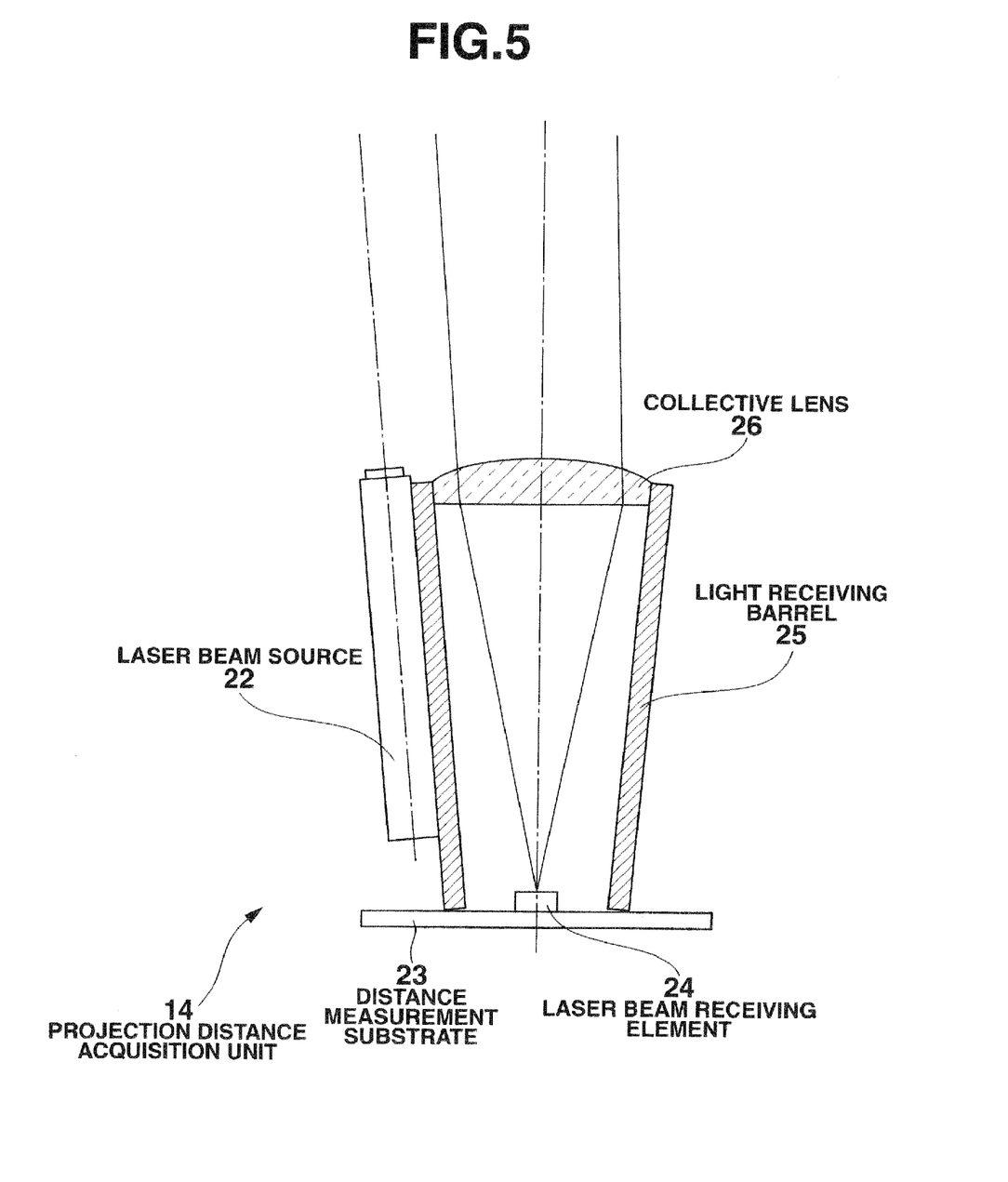
FIG. 5 is a view showing the structure of a projection distance acquisition unit according to the embodiment.

FIG. 5 is a view schematically showing the structure of a projection distance acquisition unit 14.

The projection distance acquisition unit 14 includes a distance measurement substrate 23, a laser beam receiving element 24, light receiving barrel 25, a laser beam source 22 and a collective lens 26. Specifically, the laser beam receiving element 24 is fixed on the distance measurement substrate 23.

The light receiving barrel 25 has a cone-like trapezoidal cylinder having openings at both end faces, and arranged to enclose therein the laser beam receiving element 24. The laser beam source 22 is arranged on the outer side surface of the light receiving barrel 25, and for example, emits a pulse laser having the peak wavelength in a red area. The collective lens 26 is arranged at one distal end portion of the light receiving barrel 25. The laser beam receiving element 24 receives a pulse laser emitted from the laser beam source 22, which is reflected by an observation screen 61. Further, the laser beam receiving element 24 is configured to have light receiving sensitivity to the peak wavelength of the pulse laser higher than other wavelength area.

Namely, the projection distance acquisition unit 14 is configured to detect a distance to the observation screen. Specifically, the pulse laser is emitted from the laser beam source 22, and then, reflected at the observation screen (projection screen 61). The reflected pulse laser is detected by the laser beam receiving element 24, and thus, based on the run time of the pulse laser between the element 24 and the screen 61, the distance from the element 24 to the observation screen 61 is detected. Further, the projection distance acquisition unit 14 carries out the foregoing distance measurement based on instructions from the irradiation timing control unit 57 described later. When the foregoing distance measurement is carried out, the unit 14 supplies the obtained projection distance signal to a focus control unit 55.

Figure 6:
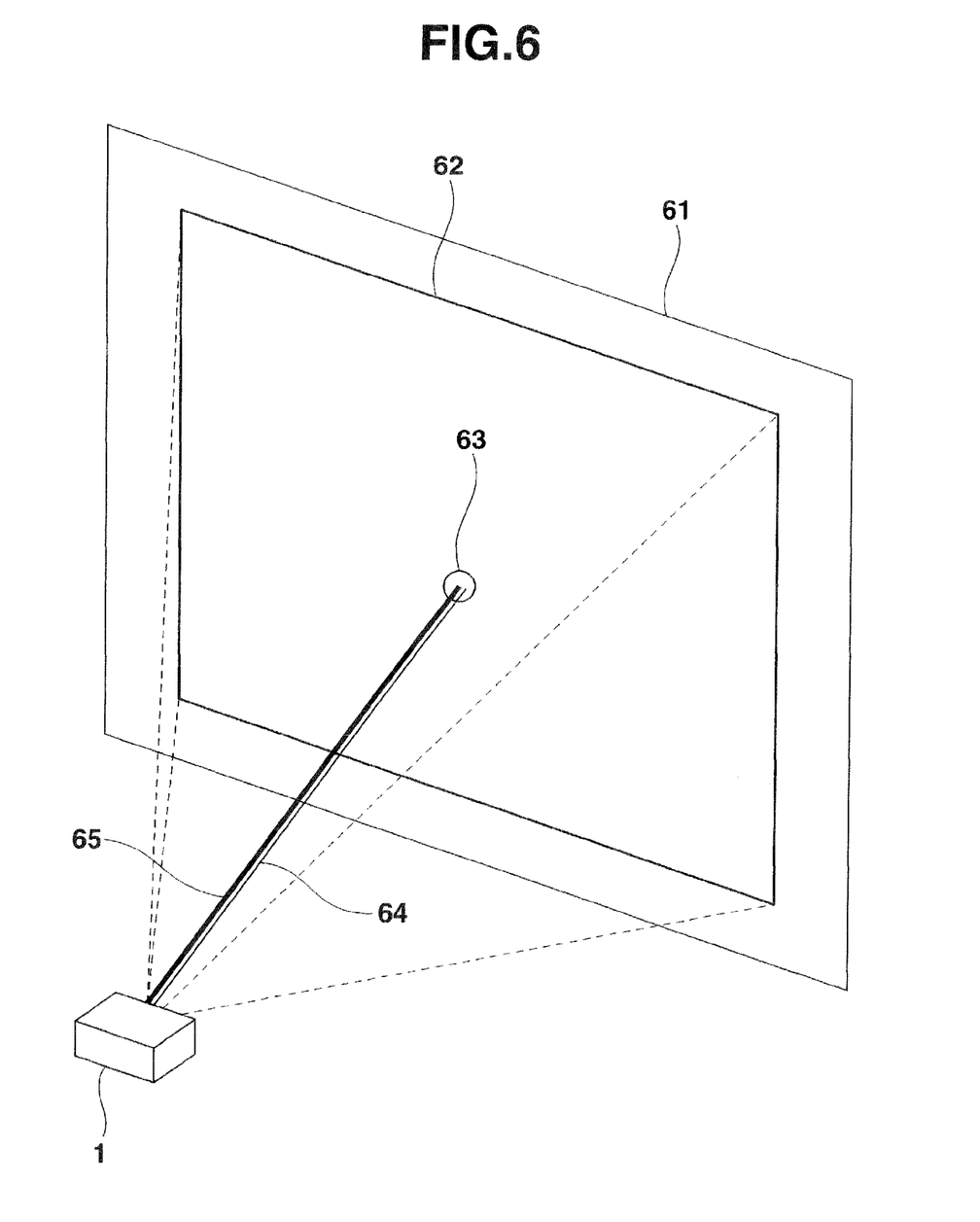
FIG. 6 is a view to explain a projection image range on a projection screen and a laser distance measurement point.

As seen from FIG. 6, the arrangement position of the projection distance acquisition unit 14 is adjusted so long as the distance to the projection screen 61 is more than at least a predetermined distance. In this case, a pulse laser irradiated area on the screen 61, that is, a laser distance measurement point 63 is set around the center on a projection area of a projection image projected on the projection screen 61. For example, the projection distance acquisition unit 14 and the projection optical system 36 are arranged close to each other so that a main optical axis 64 of projected light and a trace 65 of the pulse laser emitted from the laser beam source 22 becomes parallel.

A controller 50 includes a ROM permanently storing an operation program of the projector 1, a RAM used as a work memory, and a CPU developing and executing the program stored in the ROM. As shown in FIG. 2, the controller 50 has the following functional block configuration which includes the controller 50 includes a light source control unit 51, a temperature control unit 52, and a projection drive control unit 53. The controller 50 further includes an irradiation timing control unit 57, a focus control unit 55 and a built-in counter 56. Specifically, the light source control unit 51 turns on a halogen lamp of the light source unit 33 in accordance with the operation of the lamp switch key. The temperature control unit 52 controls the rotation of cooling fan 32 based on temperature detected by a plurality of temperature sensors 31 one of which is provided in the light source unit 33, for example. The projection drive control unit 53 controls the rotation of the color wheel 72, and controls the conversion circuit 40 to read out predetermined image data, and further, displays an image based on the image data on the projection screen 61 via the DMD 35. The irradiation timing control unit 57 is configured to irradiate a laser from the projection distance acquisition unit 14 at predetermined timing so that the unit 14 acquires a projection distance to the projection screen 61. The focus control unit 55 moves and controls a focus lens position via a lens drive unit 37 based on the acquired projection distance to the projection screen 61. The built-in counter 56 counts time for taking timing for carrying out distance measurement. The light source control unit 51 further controls turn-off with respect to the turned-on halogen lamp based on the detected temperature by the temperature sensor 31. The temperature control unit 52 controls the rotation of the cooling fan 32 so that the rotation continues until the temperature detected by the temperature sensor 31 is reduced to a predetermined temperature or by predetermined time.

The projection drive control unit 53 outputs a rotation drive control signal for controlling the rotation of the color wheel 72 periodically modulating the emitted light from the light source unit 33 to R, G and B component lights. The rotation drive control signal includes information such as a start position when the color wheel 72 is driven, a rotation cycle and a rotation direction thereof. When the signal is supplied from the unit 53 to the color wheel 72, the color wheel 72 is rotated based on the information.

The projection drive control unit 53 is configured to extract timings of the emitted light from the light source unit 33 which is modulated to R, G and B components by the color wheel 72 based on the rotation drive control signal for controlling the rotation of the color wheel 72. Then, the unit 53 outputs a color component timing signal showing the timing to the conversion circuit 40 and the irradiation timing control unit 57 described later. Further, the unit 53 is configured to control the conversion circuit 40 to read image data based on the color component timing signal output from the unit 53, and then, to supply it to the DMD 35.

Namely, the projection drive control unit 53 successively modulates the emitted light from the light source unit 33 to R, G and B components at equal intervals by driving the color wheel 72, and then, the modulated color components are emitted to the DMD 35. On the other hand, the unit 53 outputs the foregoing color component timing signal to the conversion circuit 40 so that the circuit 40 outputs image data based on the color component timing signal to the DMD 35. Then, the DMD 35 reflects the emitted light having each color component successively modulated by the color wheel 72 to the projection screen 61 based on the corresponding image data to display the corresponding color images. The image data corresponds to the emitted light having modulated each color component sent from the conversion circuit 40. Namely, as depicted in FIG. 4, the projection drive control unit 53 periodically projects R component image, G component image and B component image onto the projection screen 61 via the color wheel 72, the conversion circuit 40 and the DMD 35. In this case, a period when the color wheel 72 makes one rotation is set to one cycle, and one-frame image is divided into an image for each color component of RGB in one cycle; in this way, R component image, G component image and B component image are displayed. The foregoing one cycle has a period shorter than one sixtieth second, and thereby, the viewer feels no flicker.

When a color component timing signal is sent from the projection drive control unit 53, the irradiation timing control unit 57 causes the projection distance acquisition unit 14 to carry out distance measurement based on the color component timing signal. Specifically, as seen from FIG. 4, the unit 57 determines a period showing timing the color component timing signal sent from the unit 53 is modulated to G or B component except R component as a period enabling distance measurement with respect to the unit 14 (distance measurement enabling period). Conversely, the unit 57 determines a period showing timing the color component timing signal is R component as a period disabling distance measurement with respect to the unit 14 (distance measurement disabling period). When distance measurement is carry out, the unit 57 outputs a distance measurement instruction signal for carrying out distance measurement by the unit 14 during the distance measurement enabling period.

When receiving the distance measurement instruction signal from the irradiation timing control unit 57, the projection distance acquisition unit 14 irradiates a pulse laser toward the projection screen 61. Then, the unit 14 calculates a projection distance to the projection screen 61 based on a time interval until the pulse laser is reflected on the projection screen 61 and reaches at the unit 14. The unit 14 further outputs the calculated projection distance information to a focus control unit 55 described later.

Namely, the irradiation timing control unit 57 causes the projection distance acquisition unit 14 to carry out distance measurement at the timing when the emitted light from the light source unit 33 is modulated to G or B component by the color wheel 72. The foregoing configuration is provided, and thereby, the projection drive control unit 53 synchronizes the two timings in the distance measurement, wherein one is a timing when the emitted light from the light source unit 33 is modulated to light having a wavelength different from that of the laser beam generated from the source 22, and the other is a timing when the projection distance acquisition unit 14 emits a laser beam. As a result, in the distance measurement, the emitted light projected on the projection screen does not give a bad influence to the accuracy of distance measurement. Therefore, the distance to the projection screen 61 is obtained with high accuracy.

The focus control unit 55 controls a focus lens position based on projection distance information calculated by the projection distance acquisition unit 14 and sent from there. Specifically, an internal memory is previously stored with corresponding data of a focus lens position where a projected image displayed on the projection screen 61 is focused and a projection distance. When the projection distance acquisition unit 14 acquires the projection distance, the focus control unit 55 reads a focus lens position signal corresponding to the acquired projection distance from the internal memory. Thereafter, the unit 55 drives the lens drive unit 37 so that a focus lens position is set to the read focus lens position.

In the projector 1 having the foregoing configuration, the laser distance measurement operation by the projection drive control unit 53 and the irradiation timing control unit 57 will be described below. Moreover, the focus control operation by the focus control unit 55 based on the projection distance acquired by the laser distance measurement will be described below. First, the laser distance measurement operation will be described with reference to a flowchart of FIG. 7.

Figure 7:
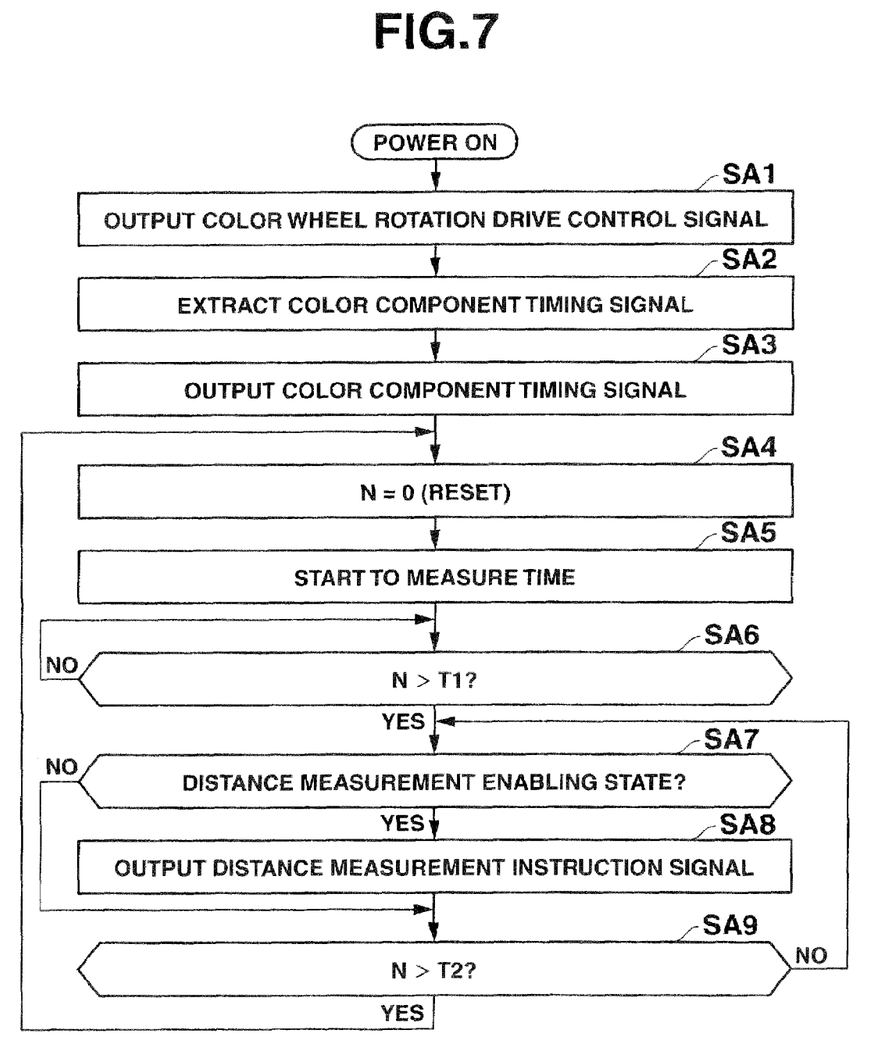
FIG. 7 is a flowchart to explain a laser distance measurement operation in this embodiment.

When the power of the projector 1 is turned on, light is emitted from the light source unit 33. Then, the projection drive control unit 53 outputs a rotation drive control signal for controlling the rotation of the color wheel 72 based on image data sent from the input connector 21 (SA1). The color wheel 72 starts to rotate from a predetermined start position at predetermined speed based on the foregoing rotation drive control signal. In this case, the projection drive control unit 53 extracts a color component timing control signal showing timing that the emitted light is modulated to R, G and B components based on the rotation drive control signal (SA2). The unit 53 outputs the extracted color component timing control signal to the conversion circuit 40 and the irradiation timing control unit 57 (SA3). The projection drive control unit 53 controls the color wheel 72, the conversion circuit 40 and the DMD 35, and thereby, displays the image on the projection screen 61.

A count N of the previously built-in counter 56 is reset to zero (N=0), and then, the counter 56 starts the count operation (time measurement) (SA4, SA5).

It is determined whether or not the count N of the built-in counter 56 exceeds a first threshold T1 (SA6). As a result, if the count N of the built-in counter 56 exceeds a first threshold T1 (SA6/Y), the irradiation timing control unit 57 determines whether or not arbitrary timing is a distance measurement enabling period based on the color component timing signal sent from the projection drive control unit 53 (SA7). The foregoing first threshold T1 is a value set as a time interval of laser distance measurement periodically carried out. In addition, the predetermined value may be stored as the first threshold T1. Moreover, the value may be changed based on the operation by the user via the key input/indicator 20 or may be changed via a remote controller.

The color component timing signal sent from the projection drive control unit 53 shows timing that the emitted light from the light source unit 33 is modulated to G or B component by the color wheel 72. In this case, the irradiation timing control unit 57 determines that the timing is a distance measurement enabling period (SA7/Y). Thereafter, the unit 57 outputs a distance measurement instruction signal to the projection distance acquisition unit 14 (SA8).

When the color component timing signal shows timing that the emitted light from the light source unit 33 is modulated to R component by the color wheel 72, the irradiation timing control unit 57 determines that the timing is a distance measurement disabling period (SA7/N), and then, the procedure proceeds from step SA7 to step SA9.

If the count N measured by the built-in counter 56 does not exceed a second threshold T2 set larger than the first threshold T1 (SA9/N), the procedure returns to step SA7, and then, it is again determined whether or not distance measurement is carried out. Conversely, if the count N of the built-in counter 56 exceeds the second threshold T2 (SA9/Y), the procedure returns to step SA4, and then, the count N of the built-in counter 56 is reset to zero.

Namely, the irradiation timing control unit 57 makes the following determination during the built-in counter value N changes from the first threshold T1 to the second threshold T2. That is, the unit 57 determines whether the distance measurement by the projection distance acquisition unit 14 should be enabled or disabled based on the color component timing signal output from the projection drive control unit 53. If the measurement is enabled, the unit 57 outputs a distance measurement enabling signal to the unit 14. In this case, the second threshold T2 is so set that the time interval from the first threshold T1 to the second threshold T2 is enough to acquire the projection distance. In addition, the predetermined values may be stored as the first and second thresholds T1 and T2. Moreover, the value of T1 and/or T2 may be changed based on the operation by the user via the key input/indicator 20 or via a remote controller.

Figure 8:
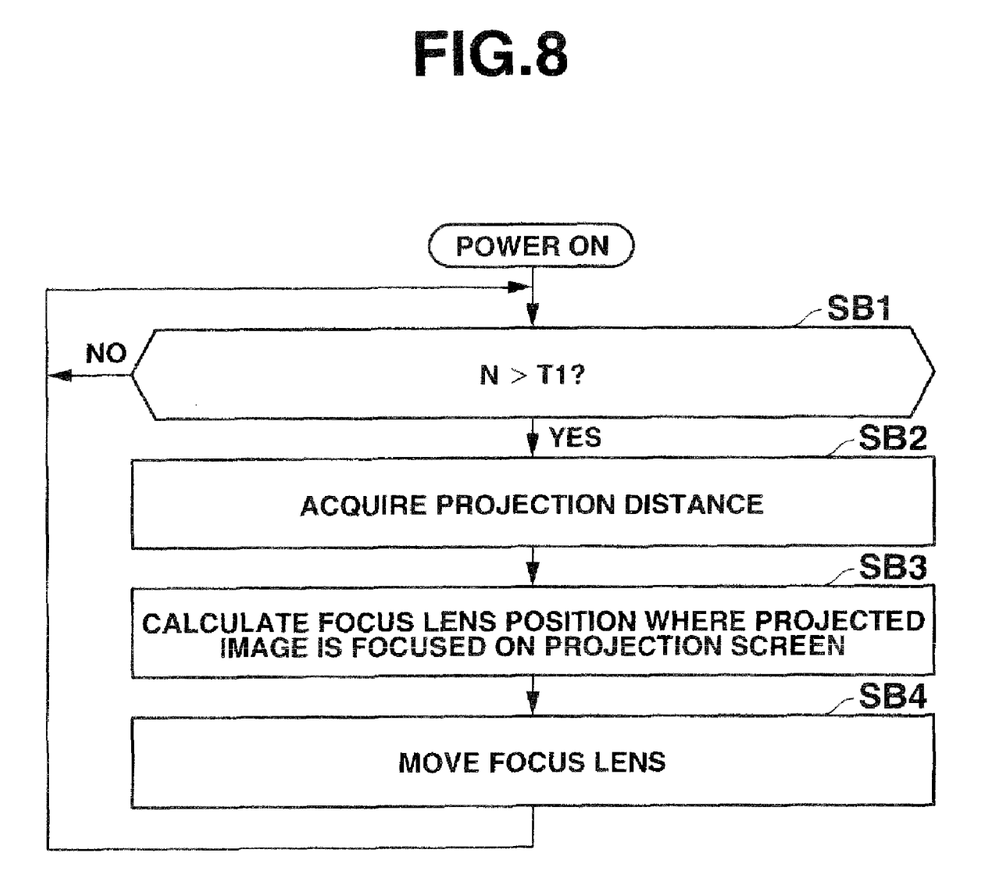
FIG. 8 is a flowchart to explain a focus control operation in this embodiment.

The operation by the focus control unit 55 controlling a focus will be described below with reference to a flowchart of FIG. 8.

When a counter value N of the built-in counter 56 exceeds a first threshold T1 (SB1/Y), the projection distance acquisition unit 14 irradiates a pulse laser to the projection screen 61 based on a distance measurement instruction signal output from the irradiation timing control unit 57. Then, the unit 14 receives the reflected pulse laser light, which is returned by reflection on the projection screen 61. Thereafter, the unit 14 calculates and acquires a projection distance to the projection screen 61 based on the time until the pulse laser light is returned (SB2).

As described above, the projection distance acquisition unit 14 measures the distance to the projection screen 61 at timing when the emitted light from the light source unit 33 is modulated color components except R component having the same wavelength as the laser beam from the unit 14. Thus, a color component image having the same wavelength as the laser beam is not projected on the projection screen 61 in the distance measurement period. Therefore, distance measurement accuracy is not degraded due to an influence of reflected light as the projected image, so that the projection distance to the projection screen is acquired with high accuracy. In addition, since the projection distance to the projection screen 61 is acquired by using the laser, time spent for acquiring the projection distance may be shortened.

Then, the focus control unit 55 detects a focus lens position where the projected image is focused on the projection screen 61 based on the projection distance acquired by the projection distance acquisition unit 14 (SB3). Namely, the unit 55 reads focus lens position data corresponding to the acquired projection distance from an internal memory. The unit 55 drives the lens drive unit 37 to move a focus lens based on the focus lens position data read from the internal memory (SB4). Thereafter, the operation returns to step SB1.

According to the foregoing operation, the projector 1 can highly accurately and speedily measure the distance to the projection screen. Based on the obtained projection distance, the projector 1 drives the focus lens to control a focus. In this way, an image easy to be seen is provided, and user's availability in using the projector 1 is improved.

According to the foregoing embodiment, the focus control is periodically carried out using the projection distance obtained by laser distance measurement. In addition, for example, the focus control may be carried out based on instructions made by the user via the key/indicator 20 or via a remote controller.

According to the foregoing embodiment, the second threshold value T2 is so set to a time that the interval from the first threshold value T1 to the second threshold value T2 is enough to acquire the projection distance, and distance measurement may be carried out during the set time interval. Further, in the distance measurement, for example, a predetermined number of times of distance measurement may be carried out during an interval until T2 from T1, so that the average of the obtained several projection distances may be determined as the final projection distance, and then, the focus control may be carried out.

According to the foregoing embodiment, the focus control is carried out based on the projection distance acquired by the laser measurement. The present invention is not limited to the foregoing embodiment. For example, this embodiment is applicable to the following aspects. Specifically, one is the case of making a distortion correction (trapezoid correction) based on the acquired projection distance. Another is the case of controlling audio volume based on the acquired projection distance. Further is the case of changing a projection size based on the acquired projection distance. Still further is the case of adjusting the brightness and chromaticity of the projected image based on the acquired projection distance. In particular, when distortion correction is made, three projection distance acquisition units each similar to the unit 14 are provided, for example. These units carry out distance measurement with respect to different three points on the projection screen. Then, an inclination angle of the projection screen is calculated from the obtained three projection distances, and thus, the distortion correction may be carried out based on the inclination angle. Or, there is provided a movable projection distance acquisition unit 14 capable of measuring different three points on the projection screen. Then, an inclination angle of the projection screen is calculated from the obtained three projection distances, and thus, the distortion correction is carried out based on the inclination angle.

According to the foregoing embodiment, the color wheel 72 is configured to modulate light to three colors of R, G, and B color component at every predetermined timing. The present invention is not limited to the forgoing color wheel. For example, the color wheel may comprise four or more components, that is, R, G, B and W (white component).

According to the foregoing embodiment, the projection drive control unit 53 rotates the color wheel 72 at a fixed rotational speed. However, the present invention is not limited to the foregoing embodiment. For example, the rotational speed may be optionally changed in accordance with the using condition. In this case, the unit 53 may be configured to extract a color component timing signal in accordance with the optionally changed rotational speed of the color wheel 72.

According to the foregoing embodiment, the rotation of the color wheel 72 is controlled based on the rotation drive control signal output from the projection drive control unit 53 when the power of the projector 1 is turned on. In addition, for example, the rotation of the color wheel 72 may be detected using a photo-sensor, and then, the rotation speed of the color wheel 72 is periodically corrected.

According to the foregoing embodiment, the color wheel 72 is rotated at high speed to successively modulate the emitted light from the light source to a plurality of color components at predetermined time intervals. However, the present invention is not limited to the foregoing configuration. For example, some LEDs emitting different color component lights in time division may be used as the light source. Even if the foregoing configuration is provided, turn-on timing of each light source is controlled, and thereby, a plurality of color component lights are successively emitted at predetermined intervals. In any case, any other form may be used so long as distance measurement is carried out at timing when the color component projected on the projection screen 61 as an image is not the same as laser color component used for the distance measurement.

According to the foregoing embodiment, the projection distance acquisition unit 14 employs a laser light being irradiated to the projection screen 61 to carry out the distance measurement. However, the present invention is not limited to the foregoing embodiment. For example, light for acquiring the projection distance may be the laser light emitted from a semiconductor, the light emitted from an LED, and the light prepared by modulating the light emitted from the LED.

According to the foregoing embodiment, laser measurement is carried out at timing when the light with a wavelength as an image light projected on the projection screen is not a red component. In this case, it is considered that the peak wavelength of the pulse laser is a red component. However, the peak wavelength of the pulse laser is not limited to the red component. Laser measurement timing is determined in accordance with color component of the peak wavelength of the pulse laser. In any case, when the distance measurement is carried out, the measurement timing is controlled so that the wavelength of light emitted for displaying an image on the projection screen 61 is not the same as the wavelength of light for acquiring the projection distance.

According to the foregoing embodiment, a period when light having the same wavelength as the laser wavelength is projected is determined as distance measurement disabling period. However, the present invention is not limited to the foregoing configuration. In the period when light having the same wavelength as the laser wavelength is projected, calculation of the projection distance is not carried out even if laser is irradiated. Further, even if the projection distance is calculated, the focus control may not be carried out based on the obtained projection distance. In any case, the projection distance may be acquired during a period when light having the same wavelength as the laser light is not projected. Based on the acquired projection distance, the focus control and trapezoid correction may be carried out.

According to the foregoing embodiment, laser measurement enabling or disabling is determined based on the light color component when the light from the light source unit 33 is divided into each color component by the color wheel 72. However, the present invention is not limited to the foregoing embodiments. Distance measurement may be carried out so that the light color component is not the same as the laser light based on the timing when the emitted light is emitted from the light source unit 33 when the emitted light is reflected from the projection screen by the DMD 35.

In the above-mentioned embodiments, the laser distance acquisition is performed during a timing when the emitted light irradiated from the light source 33 is modulated by the color wheel 72 to have color components other than a color light of the laser having a peak wavelength.

This timing is no more than a configuration which should be established for preventing an irradiation light having the same color component as that of the laser with a peak wavelength from being received at the laser beam receiving element 24. According to an aspect of the present invention, the timing for performing the laser distance acquisition is not limited to the above-mentioned timing.

Assume now that, for example, a period from a time when a laser beam for distance acquisition is irradiated to a time when the laser beam reflected at the projection screen is received at the laser beam receiving element 24 is substantially the same as a period from a time when the emitted light is irradiated from the light source 33 to a time when the emitted light reflected at the projection screen is received at the laser beam receiving element 24. In this case, the laser distance measurement enabling period may be set during a period starting from a time immediately after the irradiation light with a color component irradiated from the light source 33 which is different from that of the laser peak wavelength is irradiated (or immediately after the irradiation light being modulated to a light having color components other than that of the color component of the laser with the peak wavelength is irradiated), until a time at which a light having the same color component as that of the laser with the peak wavelength is irradiated from the light source 33 (or a light being modulated to the same color component as that of the laser peak wavelength is irradiated from the light source 33).

Further, when a traveling speed of the light is taken into consideration, the laser distance measurement enabling period may be set as a period starting at a time when the emitted light irradiated from the light source 33 is modulated at the color wheel 72 to a emitted light having a color component different from that of the laser peak wavelength. Even if the laser distance measurement enabling period is set in a manner as describe above, the difference between these periods is very small and an aspect of the present invention also may be realized.

Further, according to an aspect of the present invention, the laser distance measurement enabling period may be set as a period starting at a time when an image corresponding to a emitted light with a color component other than that of the laser with the peak wavelength is projected on the projection screen by the DMD 35.

Still further, an embodiment of the present invention may be realized in an aspect in which a period from a time when a laser beam for distance acquisition is irradiated to a time when the laser beam reflected at the projection screen is received at the laser beam receiving element 24 is not substantially the same as a period from a time when the emitted light is irradiated from the light source 33 to a time when the emitted light reflected at the projection screen is received at the laser beam receiving element 24. Even in this particular case, a laser distance measurement may be performed correctly by controlling a timing of the laser distance measurement so that when the laser beam is received at the laser beam receiving element 24, a emitted light with the same color component as that of the laser peak wavelength is not received at the element 24.

All disclosure including a specification, claims, drawings and abstract described in Jpn. Pat. Appln. No. 2008-038147 filed on Feb. 20, 2008 may be incorporated herein by reference.

Typically various embodiments are shown and described; however, the present invention is not limited to these embodiments. Therefore, the scope of the present invention is limited to the following scope of claims.

What is claimed is:

1. A projection apparatus comprising:
    a light source successively emitting each of a plurality of color components of an emitted light at a predetermined time interval;
    a display element displaying an image corresponding to the emitted light emitted from the light source on a projection screen; and
    a projection distance acquisition unit irradiating light to the projection screen to acquire a distance from the projection apparatus to the projection screen,
    wherein the projection distance acquisition unit acquires a distance from the projection apparatus to the projection screen during a period when the light source emits the emitted light having other color components except any one color component of the emitted color components.

2. The apparatus according to claim 1, wherein the other color component is a color component different from a color component including the peak wavelength of the light irradiated by the projection distance acquisition unit.

3. The apparatus according to claim 1, wherein the light source includes a light source unit emitting an emitted light, and a color wheel successively modulating the emitted light from the light source unit to each color component.

4. The apparatus according to claim 1, wherein the light source includes a plurality of LEDs corresponding to each color component.

5. The apparatus according to claim 1, wherein the display element is a digital micro-mirror device.

6. The apparatus according claim 1, further comprising:
    a focus control unit controlling a focus of a projected image imaged on the projection screen based on the distance to the projection screen acquired by the projection distance acquisition unit.

7. The apparatus according to claim 1, further comprising:
    a distortion correction unit correcting distortion of a projected image imaged on the projection screen based on the distance from the projection apparatus to the projection screen acquired by the projection distance acquisition unit.

8. The apparatus according to claim 7, wherein the projection distance acquisition unit irradiates light toward at least three points on the projection screen to acquire a distance from the projection apparatus to each of the three points, and the distortion correction unit corrects distortion of a projected image imaged on the projection screen based on a distance from the projection apparatus to the each point acquired by the projection distance acquisition unit.

9. A projection apparatus comprising:
a light source successively emitting each of a plurality of color components of an emitted light at a predetermined time interval;
a display element displaying an image corresponding to the emitted light emitted from the light source on a projection screen;
a projection distance acquisition unit irradiating light to the projection screen to acquire a distance from the projection apparatus to the projection screen; and
an irradiation timing control unit disabling acquisition of the distance from the projection apparatus to the projection screen by the projection distance acquisition unit during a period when the light source emits an emitted light having a predetermined color component.

10. A projection apparatus comprising:
a light source successively emitting each of a plurality of color components of an emitted light at a predetermined time interval;
a display element displaying an image corresponding to the emitted light emitted from the light source on a projection screen; and
a projection distance acquisition unit irradiating light to the projection screen to acquire a distance from the projection apparatus to the projection screen,
wherein the projection distance acquisition unit acquires a distance from the projection apparatus to the projection screen during a period when the display element displays an image corresponding to other color components except any one of color components emitted by the light source.

11. A projection apparatus comprising:
a light source unit emitting an emitted light;
a color wheel positioned at an emission direction of the emitted light from the light source unit to successively modulate the emitted light to a plurality of different color components when the emitted light from the light source unit passes there through;
a display element displaying an image corresponding to a color component of the emitted light modulated by the color wheel on the projection screen;
a projection distance acquisition unit irradiating light to the projection screen to acquire a distance from the projection apparatus to the projection screen; and
a controller synchronizing a timing when the projection distance acquisition unit irradiates the light onto the projection screen with a timing when the color wheel modulates a color component of the emitted light to a predetermined color component.

12. A projection apparatus comprising:
a light source successively emitting each of a plurality of color components of an emitted light at a predetermined time interval;
a display element displaying an image corresponding to the emitted light emitted from the light source on a projection screen;
a projection distance acquisition unit irradiating light onto the projection screen to receive a reflected light of the light from the projection screen for acquiring a distance from the projection apparatus to the projection screen; and
an irradiation timing control unit controlling timing irradiating the light so that when the projection distance acquisition unit receives the reflected light, an emitted light from the light source via projection screen does not contain a predetermined color component.

13. The apparatus according to claim 1, wherein light irradiated by the projection distance acquisition unit is a laser beam.

14. A distance measurement method, comprising:
acquiring a distance from a projection apparatus to a projection screen by irradiating a light onto the projection screen to receive a reflected light reflected from the projection screen for acquiring the distance, during a period when an image corresponding to each of color components of the emitted light successively emitted from a light source is displayed on the projection screen; and
controlling an irradiating timing of the light so that the emitted light emitted from the light source and reflected from the projection screen does not contain a predetermined color component, when the reflected light is received during the distance acquiring step is executed.

15. The method according to claim 14, wherein the light is a laser beam light.

* * * * *